M. P. RYDER.
STARTING DEVICE FOR INTERNAL COMBUSTION ENGINES.
APPLICATION FILED FEB. 28, 1912.
1,166,084.
Patented Dec. 28, 1915.
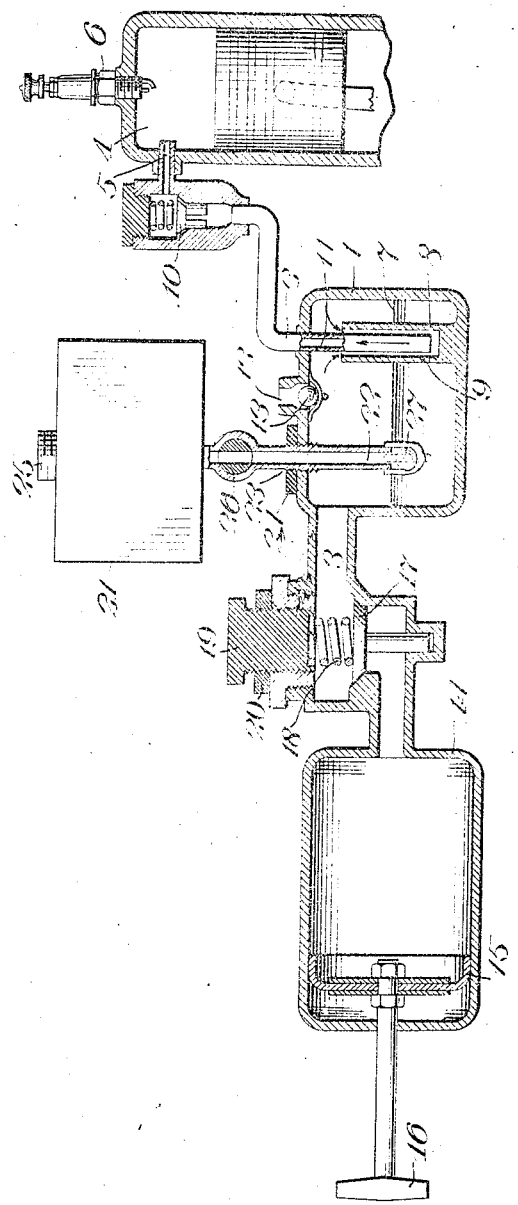
WITNESSES
F. B. Townsend.
M. A. Porter.
INVENTOR
Malcolm P. Ryder.
BY
Townsend & Decker
ATTORNEYS

UNITED STATES PATENT OFFICE.

MALCOLM P. RYDER, OF SPRINGFIELD, MASSACHUSETTS.

STARTING DEVICE FOR INTERNAL-COMBUSTION ENGINES.

1,166,084.　　　　Specification of Letters Patent.　　Patented Dec. 28, 1915.

Application filed February 28, 1912.　Serial No. 680,484.

*To all whom it may concern:*

Be it known that I, MALCOLM P. RYDER, a citizen of the United States, and a resident of Springfield, in the State of Massachusetts, have invented certain new and useful Improvements in Starting Devices for Internal-Combustion Engines, of which the following is a specification.

My invention relates to that class of starting devices for internal combustion engines wherein a definite amount of priming fluid is blown into the cylinder or cylinders of the engine by the use of air or gas under pressure applied to a measured charge of fluid.

The object of my invention is to provide an apparatus which shall be free from the objections incident to previous forms of apparatus which require the use of a valve which must be liquid- and air-tight, and which ordinarily requires large surfaces that have to be ground to a perfect fit.

A further object of my invention is to provide an apparatus containing simple means for varying the size of the charge of priming fluid introduced at each operation.

A further object is to provide a simple and cheap construction, easily operated, and which shall insure a sudden and violent displacing of the priming fluid by the action of air or gas under pressure.

The invention consists in the combinations of apparatus, details of construction, and improvements hereinafter described and particularly specified in the claims.

In the accompanying drawings I have shown in vertical central section one of the forms of apparatus in which my invention may be embodied.

1 is an air and fluid chamber which is practically an air-tight vessel and which may be made entirely of metal or with glass sides, so that the fluid level therein can be observed. In the operation of the apparatus this chamber is made to contain a certain amount of priming fluid which is maintained at or about a predetermined level by any suitable means, as for instance, by a float-controlled valve such as is used in an ordinary float-feed carbureter, or by the use of a substantially air-tight tank which feeds fluid into chamber 1 through a normally submerged outlet, as will be presently more fully described.

2 is a pipe having its end normally submerged beneath the level of the fluid maintained in chamber 1 and through which the fluid is blown, by sudden pressure of air or gas provided in the space above the fluid and admitted thereto through a pipe 3 of good size. The mixture or outlet pipe 2 communicates with the engine cylinder or cylinders 4 through the mixture spraying jet 5. The usual spark plug of an internal combustion engine is indicated at 6.

Inasmuch as it is convenient to make the chamber 1 of considerable size so that it will hold a larger amount of fluid than is necessary for a single priming charge, it is preferable to use an accessory chamber adapted to hold a smaller amount of fluid sufficient for one charge and communicating with the fluid containing space in the chamber 1. Such an accessory or supplemental measuring chamber is conveniently provided by a standpipe 8 within which the mixture outlet pipe 2 extends downward, with its lower end below the fluid level indicated by the line 7, and wherein it has free communication with the fluid spaces in said standpipe or measuring chamber by said open lower end. The upper end of the standpipe communicates with the air space in the chamber 1 and its lower end below the normal level 7 of the fluid is provided with a narrow or restricted passage 9, which allows the priming fluid to flow into the standpipe or measuring chamber up to the general level of the fluid in the chamber 1.

A check valve such as indicated at 10 may be interposed in the connection between the mixture pipe 2 and the spraying jet 5 if desired. This valve serves to automatically prevent the pressure from the engine while the engine is in operation from backing up into pipe 2 and, inasmuch as it is held to its seat by a spring, as shown, it may also serve to prevent the partial vacuum in the engine cylinder, during the suction stroke, from drawing priming fluid from the fluid chamber through the submerged end of said mixture pipe. Within the air and fluid chamber 1 the pipe 2 may be provided with a small vent-hole 11 above the fluid level so that, by the equalization of pressure, the fluid may rise to its natural level within the lower or submerged end of the tube, as well as in the portion of the measuring space around it. The vent 11 also serves, in case of a moderate amount of leakage past valve 10 such as might occur in service, to prevent either pressure or vacuum in the mixture or outlet pipe 2 from affecting the fluid level in the measuring chamber or spaces containing the measured or determinate quantity of fluid that is to be blown into the engine-cylinder.

Chamber 1 is preferably provided with a normally open small air-vent indicated at 12, so that any moderate leakage of valve 10 can cause neither pressure nor vacuum in the chamber 1. An automatic air-check valve for this air-vent may be provided to prevent rush of air through the same when the pressure of air or gas is applied through pipe 3 to blow the charge in the measuring chamber into the mixture pipe 2. This automatic check is shown as a ball check 13, but this can be dispensed with if the size of the passage which it controls is small enough to prevent any considerable escape of air or fluid during the short time that the air pressure is applied in the chamber 1 or its accessory measuring chamber 8.

The air pressure for forcing the priming fluid into the mixture pipe and thence to the cylinder may be taken from any desired source, as for instance, an air storage tank kept filled by any suitable means, but it is preferably delivered in measured quantity from a container of definite cubical contents as for instance from the cylinder of an air pump, manually or otherwise operated, as occasion requires.

I have shown a manually operated pump in typical form and comprising the usual cylinder 14 provided with an ordinary cup-washer piston 15, which allows air to pass it freely on the outward stroke and expands against the cylinder walls so as to make an air-tight fit during the inward stroke, and operating handle 16 for moving the piston. As will be seen, the whole contents of the cylinder are delivered at each full stroke and hence a definite amount of air predetermined by the size of said chamber is delivered at each stroke of the piston for commixture with the liquid fuel employed. Hence, in effect the air pump is a measuring device operating on the same plan as many forms of liquid measure in which the pistons work in chambers of definite cubical contents to measure the liquid.

In order to insure a sudden and violent displacing of the priming fluid from the space in which it is practically measured when it is to be blown into the mixture pipe or passage in the operation of the device, I insert between the source of air or gas used for this blowing operation and the air and fluid chamber, a suitable automatic valve which will not open until a proper pressure exists or is accumulated behind it, but will thereafter open and allow inrush of air into the passage 3. Such valve, as will be seen, is similar in its operation to an ordinary pop safety valve and may be constructed as shown in the drawings, of a valve 17, held to its seat by a spring 18. A plug 19 engages the rear end of the spring and may be screwed down so as to hold the valve to its seat, until a considerable or desired pressure has been produced in the pump cylinder by the inward movement of the piston. A lock-nut 20 serves to hold the plug 19 in adjusted position. The air pressure valve 17 is not essential to the working of the device, but should preferably be used to insure positive action in the hands of an ignorant or careless operator, who might fail to obtain the best results through operating the air pump too slowly; with the result that too much of the air would escape through vent 12 without closing check ball 13.

Assuming that the priming fluid stands in the chamber 1 and measuring standpipe or chamber 8 at the level indicated, which is the adjusted level maintained by the device, an example of which will be presently described, the operation in priming the engine cylinder would be as follows: A piston 15 is brought approximately to position shown and then suddenly forced forward to press the air in the cylinder by its inward movement. As soon as pressure has accumulated to a degree sufficient to lift the valve 17, the said valve suddenly opens, allowing air in considerable volume and pressure to pass freely, by the passage 3, into the air and fluid chamber 1. As the air tends to escape from the chamber 1 through the vent 12, it lifts the check ball 13, if one be employed, and completely closes the air-vent, thus preventing further escape of air at this point. A small amount of the air may flow through the vent-hole 11, but as this vent is very small, the major portion flows, as indicated by the arrow, into the standpipe or measuring chamber and forces the fluid therefrom and from the lower portion of the mixture pipe out through said pipe, and through check valve 10 and spraying jet 5, into the engine cylinder. The filling passage 9 in the standpipe being of comparatively small dimensions, there is little displacement of fluid through this passage during the short time that the air pressure lasts, and the amount of priming fluid injected into the engine cylinder is practically that which was contained in the standpipe 8 and lower end of pipe 2, and practically measured by the spaces which are supplied through the restricted opening 9, and constituting in effect the measuring chamber or space.

At the conclusion of the operation so far described, the level of fluid is automatically restored and a new charge of measured amount may pass through the restricted opening 9 into the supplemental measuring chamber or spaces connected with the air and fluid chamber proper, ready for a repetition of the operation of priming the cylinder. As will be seen, each operation is conducted by using substantially the same volume of air, the volume depending upon the cubical air contents of the cylinder 14, thus insuring a uniform proportion of air and fluid for each priming, while moreover the uniformity of operation is further secured by using the air at a predetermined pressure, determined by the adjustment of the pop valve 17. Furthermore, it will be seen that the quantity of fluid employed in each operation is also predetermined owing to the fact that the self-measuring operation is automatic.

As a means for maintaining the level of fluid in the air and fluid chamber or measuring chamber, the following devices may be employed: 21 is a fluid containing storage or supply tank which is air-tight, except for the outlet through which the priming fluid is delivered, by gravity, from said fluid tank and through a pipe 22, into the chamber 1. The lower end of the delivery pipe 22 is normally submerged beneath the fluid in the chamber 1, so that fluid will not flow from the tank 21 into said chamber, but as soon as the fluid level in chamber 1 falls below the outlet of the supply pipe 22, which occurs when the level is lowered by the blowing of the measured charge of fluid out of the chamber into the mixture pipe 2, air will be admitted to the pipe 22 and rise through said pipe into tank 21, allowing an equivalent amount of fluid to flow down through said pipe, and raising the fluid level in chamber 1 so that it will seal the end of the delivery pipe 22 and prevent further entrance of air. This action takes place after every priming operation, so that as long as the supply of fluid lasts in tank 21, the level in chamber 1 or the measuring chamber is kept at the proper height. To adjust this fluid level and thereby adjust the amount of the measured priming charge of fluid, I provide means whereby the height of the delivery opening of supply pipe 22 may be adjusted. For this purpose said pipe is provided with a screw thread 23, so that the pipe with the tank may be raised or lowered, and then locked in position by the nut 24. A valve check ball as shown at 27 may be provided at the outlet of pipe 22 into the chamber, which will be operated by the air when the application of air pressure forces the charge into the mixture pipe, and by lifting and closing the outlet opening will prevent displacement of priming fluid upward through the pipe 22 into the fluid supply tank 21. Since the check valve 13 operates at the same time to close the air-vent 12, it will be seen that the pressure has no means of escape excepting through the pipe 2. In order that the tank 21 may be refilled without allowing all the fluid contained therein to flow into the chamber 1 as soon as the air-tight cap 25 for the refilling opening is loosened, a stop-cock 26 is provided. This stop-cock must of course be closed before air enters the tank through loosening of the filler cap. After the tank is filled and the cap screwed down, stop-cock 26 may be opened.

The drawing shows only one engine cylinder and the necessary parts for priming this cylinder, but it is obvious that for a multiple cylinder engine as many fluid measuring chambers or standpipes, with their appropriate mixture pipes, as there are engine cylinders, may be provided, so that a single operation of the air pump will simultaneously charge all the cylinders and each cylinder will get its own measured charge of priming fluid.

What I claim as my invention is:

1. In a priming device for internal combustion engines, the combination of a fluid measuring chamber, a mixture pipe connected therewith below the level of fluid therein and leading to the engine cylinder, means for producing at will pressure of air or gas in the space above the fluid to blow the same through the mixture pipe into the engine cylinder and means for automatically restoring the level of fluid in said chamber after each operation.

2. In a priming device for internal combustion engines, the combination of a fluid measuring chamber adapted to hold a single measured charge of priming fluid, a mixture pipe submerged in the fluid in said chamber and connected with the engine cylinder and means for delivering into the space above the fluid a measured quantity of air or gas under pressure as and for the purpose described.

3. In a priming device for internal combustion engines, the combination of an air and fluid chamber, means for automatically maintaining the level of fluid therein, a mixture pipe having its inlet submerged in the fluid and a source of air or gas under pressure for blowing fluid from the fluid containing space in said chamber through the mixture pipe into the engine cylinder at will.

4. In a priming device for internal combustion engines, the combination of an air and liquid chamber, means for maintaining liquid at a determinate level in said chamber, a mixture pipe connected with the engine cylinder through a spraying device and having one end submerged in and communicating freely with the liquid in said chamber and means for blowing the liquid through said mixture pipe at will into the engine cylinder.

5. In a priming device for internal combustion engines, the combination of an air and fluid containing chamber adapted to hold a single measured charge of priming fluid, a mixture pipe submerged in the fluid and in free communication therewith, said mixture pipe connecting with the engine cylinder, an air measuring chamber, means for forcing the measured contents of said chamber under pressure into the space above the fluid and a puppet valve interposed in the connection from said air measuring chamber and adapted to open only after the pressure produced by forcing the air contents from the measuring chamber has accumulated to the desired amount.

6. In a priming device for internal combustion engines, the combination of an air and fluid containing chamber, a standpipe therein communicating with the fluid space by a restricted opening and having its upper end opening into the air space, a mixture pipe submerged in the fluid and connecting with the engine cylinder and means for producing pressure of air or gas in the chamber at will to blow the charge of fluid from the standpipe into the mixture pipe.

7. In a priming device for internal combustion engines, the combination of an air and fluid chamber, a standpipe therein communicating with the fluid space by a restricted opening, means for maintaining the fluid in said chamber at a predetermined level, a mixture pipe submerged in said standpipe and communicating with the engine cylinder, and means for producing pressure of air or gas in said chamber to blow the fluid contained in the standpipe into the mixture pipe and engine cylinder.

8. In a priming device for internal combustion engines, the combination of an air and fluid chamber, means for automatically maintaining the level of the fluid therein at a predetermined point, a standpipe in said chamber having a restricted opening near its bottom and below the level at which the fluid is maintained, a mixture pipe communicating with the fluid space in said standpipe at one end and with the engine cylinder at the other, and means for producing pressure of air or gas in the chamber at will to blow the fluid from the standpipe into the engine cylinder.

9. In a priming device for internal combustion engines, the combination of a fluid measuring chamber, communicating with a space in which fluid is automatically maintained at normal level, and a mixture outlet pipe having a vent into the space above the fluid to equalize the pressure and allow the fluid to rise in the measuring space.

10. In a priming device for internal combustion engines, the combination of an air and fluid chamber, a mixture pipe communicating with the fluid space therein and with the engine cylinder, means for producing pressure of air or gas in said chamber to blow the fluid therefrom into the engine cylinder, an airtight fluid supply tank and a pipe leading therefrom to feed fluid into the chamber and having its outlet normally submerged and located just below the level of fluid to be maintained in said chamber.

11. In a priming device for internal combustion engines, the combination of a fluid measuring chamber, a fluid supply tank having an outlet pipe provided with an opening normally submerged and located just below the level of fluid to be maintained in said measuring chamber, a mixture pipe opening from said chamber, and means for blowing the fluid from said chamber into the mixture pipe and engine cylinder.

12. In a priming device for internal combustion engines, the combination of a fluid measuring chamber, a mixture pipe connected therewith, means for blowing the charge of fluid in said chamber into the mixture pipe, a fluid supply tank feeding fluid, by gravity, into said chamber, and means for adjusting the level of the outlet from said tank into said chamber to vary the priming charge.

13. In a priming device for internal combustion engines, the combination of a measuring chamber, a mixture pipe communicating therewith and with the engine cylinder, means for producing pressure of air or gas on the fluid contained in said chamber to blow it into the mixture pipe at will, a fluid supply tank having an outlet normally submerged or dipping into fluid just below the level of fluid to be maintained in the measuring chamber ready for the priming operation, said outlet being so located as to be exposed above the level of the liquid in which it is submerged when the level is partially lowered, and a check valve for preventing air from blowing back through said outlet when the level of fluid falls in the priming operation.

14. In a priming device for internal combustion engines, the combination of a fluid measuring chamber, a mixture outlet pipe connected therewith below the level of the measured charge of fluid, means for supplying air or gas under pressure to the space above the measured charge and a fluid supply tank provided with an outlet pipe opening below the level of the measured charge of fluid, said pipe having a screw thread whereby it may be raised or lowered to adjust the measurements of the charge of priming fluid.

15. In a priming device for internal combustion engines, the combination of a fluid measuring chamber, having a mixture pipe connected with the fluid containing space therein, means for blowing the measured charge from said chamber by pressure of air or gas applied above the normal level of the fluid in said chamber, a fluid supply tank having an outlet normally below the normal level of the fluid in said chamber and means for adjusting the height of the outlet to adjust the volume of charge of priming fluid.

16. In a priming device for internal combustion engines, the combination of a fluid measuring chamber adapted to hold a single measured charge of priming fluid, a pipe submerged in the fluid therein and having unbroken connection with the engine cylinder, a check valve in the connection to the cylinder, means for forcing the contents of said measuring chamber into the cylinder by one operation through the application of air pressure to the surface of the liquid contained therein and an air vent of restricted capacity opening into a space normally at atmospheric pressure above the measured charge of liquid to permit the said measuring chamber to refill.

17. In a priming device for internal combustion engines, the combination with an air and fluid chamber of a standpipe having free communication at its top with the air space in said chamber and a mixture outlet pipe normally submerged in the fluid therein and having a vent in said chamber, and a normally open air-vent for said chamber and a connection between said outlet pipe and the engine containing a check valve.

18. In a priming device for internal combustion engines, the combination with an air and fluid chamber of a standpipe having free communication at its top with the air space in said chamber and a mixture outlet pipe normally submerged in the fluid therein and having a vent in said chamber, and a normally open air-vent for the chamber provided with an automatic air-check valve adapted to close by the pressure of air or gas used in forcing the priming charge into the mixture pipe and a connection between said outlet pipe and the engine containing a check valve.

19. In a priming device for internal combustion engines, the combination of means for measuring the priming fluid, means for measuring the proportion of air in a mixture of the air and said fluid, means for forcing the measured charge of air under pressure into the carbureting device, an outlet from the carbureting device to the engine cylinder and an automatic puppet valve interposed between the air measuring device and the carbureting device and adapted to open and allow the air to flow only when, in the operation of forcing the air into the carbureting device, the pressure of air has increased to a predetermined degree measured by the setting of the puppet valve.

20. In a priming device for internal combustion engines, the combination of a fluid measuring chamber adapted to hold a measured charge of priming fluid sufficient for one priming operation, a pipe connecting the same with the engine cylinder, an air pump having a cylinder of a cubic contents adapted to form a proper mixture with the contents of the fluid measuring chamber and a connection from the pump to the fluid measuring chamber whereby the charge of air therein may be blown or forced, by the operation of the piston, through the mixture pipe with the contents of the fluid measuring chamber to prime the cylinder of the engine and a puppet valve interposed in the connection leading from the pump whereby the passage of the measured quantity of air from the pump is prevented until the pressure has accumulated to the amount required for the carbureting and priming operation.

21. In a priming device for internal combustion engines, the combination of an air and fluid chamber, means for automatically maintaining the level of fluid therein, a mixture pipe opening into the fluid space therein and communicating with the engine cylinder, an air pump connected to the air space of the chamber and a puppet valve between the pump and chamber.

22. A carbureter comprising a liquid fuel reservoir provided with an inlet and an air vent, said air vent being above the fuel level in the reservoir, a normally open valve at the inlet, and means for discharging fuel from the reservoir by air pressure, the aforesaid air vent and the valve closing when air pressure is thus admitted into the reservoir.

23. A carbureter comprising a liquid fuel reservoir provided with an inlet and an air vent, said air vent being above the fuel level in the reservoir, and means for discharging fuel from the reservoir by air pressure, the aforesaid air vent being closed when air pressure is thus admitted into the reservoir.

Signed at Springfield in the county of Hampden and State of Mass. this 26th day of February A. D. 1912.

MALCOLM P. RYDER.

Witnesses:
C. STEINMETZ,
F. B. TOWNSEND.